(12) United States Patent
Stümpert et al.

(10) Patent No.: US 7,039,416 B2
(45) Date of Patent: May 2, 2006

(54) METHOD AND APPARATUS FOR ADAPTING A NUMBER OF BEARERS TO A SERVICE

(75) Inventors: Martin Stümpert, Hochspeyer (DE); Pontus Wallentin, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 175 days.

(21) Appl. No.: 10/467,943

(22) PCT Filed: Feb. 22, 2002

(86) PCT No.: PCT/EP02/01902

§ 371 (c)(1),
(2), (4) Date: Jan. 7, 2004

(87) PCT Pub. No.: WO02/069659

PCT Pub. Date: Sep. 6, 2002

(65) Prior Publication Data

US 2004/0132455 A1    Jul. 8, 2004

(30) Foreign Application Priority Data

Feb. 22, 2001   (EP) .................................. 01104330

(51) Int. Cl.
 *H04Q 7/20* (2006.01)

(52) U.S. Cl. ....................................... 455/450; 455/445

(58) Field of Classification Search ................ 455/450, 455/436, 437, 438, 439, 428, 403, 445, 452.1, 455/509, 5

See application file for complete search history.

(56) References Cited

U.S. PATENT DOCUMENTS

| | | | |
|---|---|---|---|
| 6,594,486 B1 * | 7/2003 | Rasanen ................... | 455/422.1 |
| 6,674,733 B1 * | 1/2004 | Huusko ...................... | 370/329 |
| 6,868,257 B1 * | 3/2005 | Holma ...................... | 455/63.1 |
| 2002/0066011 A1 * | 5/2002 | Vialen et al. ................ | 713/150 |
| 2002/0077065 A1 * | 6/2002 | Tamura et al. ................ | 455/72 |
| 2002/0105906 A1 * | 8/2002 | Marjelund et al. .......... | 370/229 |

\* cited by examiner

*Primary Examiner*—CongVan Tran

(57) ABSTRACT

The invention relates to the implementation of changing a service between a user equipment (UE) and a Telecommunications network operating according to Universal Mobile Telecommunication System standards by using a known radio bearer assignment message for indicating the change of use of a connection from a first service to a second service.

14 Claims, 3 Drawing Sheets

METHOD AND APPARATUS FOR ADAPTING A NUMBER OF BEARERS TO A SERVICE

FIELD OF INVENTION

The invention relates to a method for the adaptation of a number of bearers in the case that a service on a connection is changed. It further relates to a radio network controller, a mobile services switching centre, and a user equipment adapted to perform the adaptation and a radio access bearer assignment message used for performing the method.

DESCRIPTION OF PRIOR ART

The changing of a service can be used for example for the implementation of call hold and call waiting services. Call hold and call waiting services are used to enable a subscriber who already is active in a call to accept a further call. Therefore the further call is offered to the subscriber as a waiting call. The subscriber decides either to reject the further call or to put the active call on hold and to accept the further call. The handling of this feature is described in more detail in the 3GPP technical specifications 22.083, version 3.0.1 published October 1999, 23.083 version 3.1.0 published January 2000, and 24.083 version 3.0.0 published May 1999.

In the abovementioned documents it is a prerequisite that the bearer used for the active call can also be used for the further call.

The changing of radio bearer between user equipment is disclosed in the 3GPP specification TS 25.331 Version 3.1.0 published January 2001. However, said specification does not disclose that the change of radio bearer might be used for service alteration.

The initiation or indication of a changing of radio bearer is described in the 3GPP specification TS 25.413, Version 3.0.0. However, also this specification fails to describe the use of said changing for service alteration.

The evolution of third generation networks like UMTS (Universal Mobile Telecommunication System) or cellular communication systems like GPRS (General Packet Radio System), however, permits the set-up of data connections as well as speech connections to user equipment.

This may lead to a situation wherein a subscriber with an active data connection is offered a speech connection and vice versa, a so-called inhomogeneous call waiting situation.

It is not disclosed in the prior art, how to implement call waiting and call hold supplementary services for these situations. To master an inhomogeneous call waiting call hold situation, a service alteration is necessary. For the time being, no service alteration for Telecommunications networks operating according to Universal Mobile Telecommunication System standards is disclosed.

SUMMARY OF THE INVENTION

It is therefore object of the invention to provide a method for the implementation of service alteration for a UMTS network.

This problem is solved by the methods of claims 1, 6, 9, and 14, the user equipment of claim 16, the radio network controller of claim 17, the mobile services switching centre of claim 19 the computer programs of claims 20, 21 and 22, and the use of the methods according to claim 23.

Advantageous is the use of a radio bearer assignment message for the indication of the beginning of the adaptation of the number of radio bearers. The radio bearer assignment message is already defined and can be used with only minor modifications of its definition.

Further advantageous embodiments can be derived from the dependent claims 2 to 5, 7, 8, 10 to 13, 15, and 18.

Advantageous is that the user equipment keeps the call control context and the mobility management context according to claim 3 or 8. This reduces the effort of adapting the number of radio access bearers.

Further advantageous is the setting up of a connection for the second service before the connection for the first service is released according to claim 5 or 12. By this, always at least one active connection between radio network controller and user equipment exists. This has the advantage that context related data are kept automatically.

Advantageous is the dependence of the sequence of call set up and release according to claim 13. By this, an operator can decide which sequence he prefers.

The invented method for adapting a number of radio bearers of a connection between a user equipment and a Telecommunications network operating according to Universal Mobile Telecommunication System standards from a first number of radio bearers appropriate for a first service to a second number of bearers appropriate for a second service comprises the followings steps. The beginning of the adaptation is indicated by a radio access bearer assignment message that is sent from a mobile services switching centre to a radio network controller. The radio network controller sends a radio bearer set up message to the user equipment for changing the number of bearers for the connection. The user equipment modifies the number of radio access bearers it supports for the connection from the first number to the second number. It acknowledges the modification by sending a radio bearer set up complete message to the radio network controller. The radio network controller indicates the completion of the adaptation to the mobile services switching centre by sending a radio bearer assignment complete message.

The method can further comprise the additional steps that the radio network controller sends a radio bearer release message for reducing the number of bearers to the user equipment. The user equipment reduces the number of bearers and acknowledges the reduction to the radio network controller by sending a radio bearer release message.

In a preferred embodiment of the invention the user equipment keeps the call control context and the mobility management context while changing the number of bearers.

For any of the described methods also the following additional steps can be performed. The radio network controller sends a release request message to the mobile services switching centre to release the connection for the first service. The mobile services switching centre releases the first connection and sends a release confirm message to the radio network controller. The radio network controller sends an establishment request message to the mobile services switching centre to establish a connection for the second service. The mobile services switching centre sets up the connection for the second service and sends an establishment confirm to the radio network controller to confirm the set up of the connection for the second service.

The invention also relates to a user equipment, a radio network controller and a mobile services switching centre that comprise means for performing any of the described methods. It further relates to computer programs for controlling a user equipment, a mobile services switching centre and a radio network controller in a way that they perform any of the described methods.

The invention also provides a synchronisation method for inhomogeneous call waiting call hold situations. Therefore, the communication between user equipment and radio network controller is performed according to DTAP (Direct Transfer Application Part) signalling as in the cited prior art. In the case of inhomogeneous call waiting/call hold the removal or linking in of at least one CODEC (COder/DECoder) is a synchronising event.

The invention further provides a method for the set up of the connections. Therefore the RAB (Radio Access Bearer) and at least one RB (Radio Bearer) from the active call is used for the further call.

The detection within an RNC (Radio Network Controller) of a waiting call that is going to become the active call is performed by using the RAB identification of the former active call and transmitting at least one modified parameter in association with the RAB identification.

DETAILED DESCRIPTION OF EMBODIMENTS

In the following the invention is described in more detail by means of embodiments and figures. Due to the similarity of data and fax calls with respect to the invention, the invention will only be described for data calls, as the handling of a fax call is equal. Equal reference signs indicate equal elements.

Figure 1:
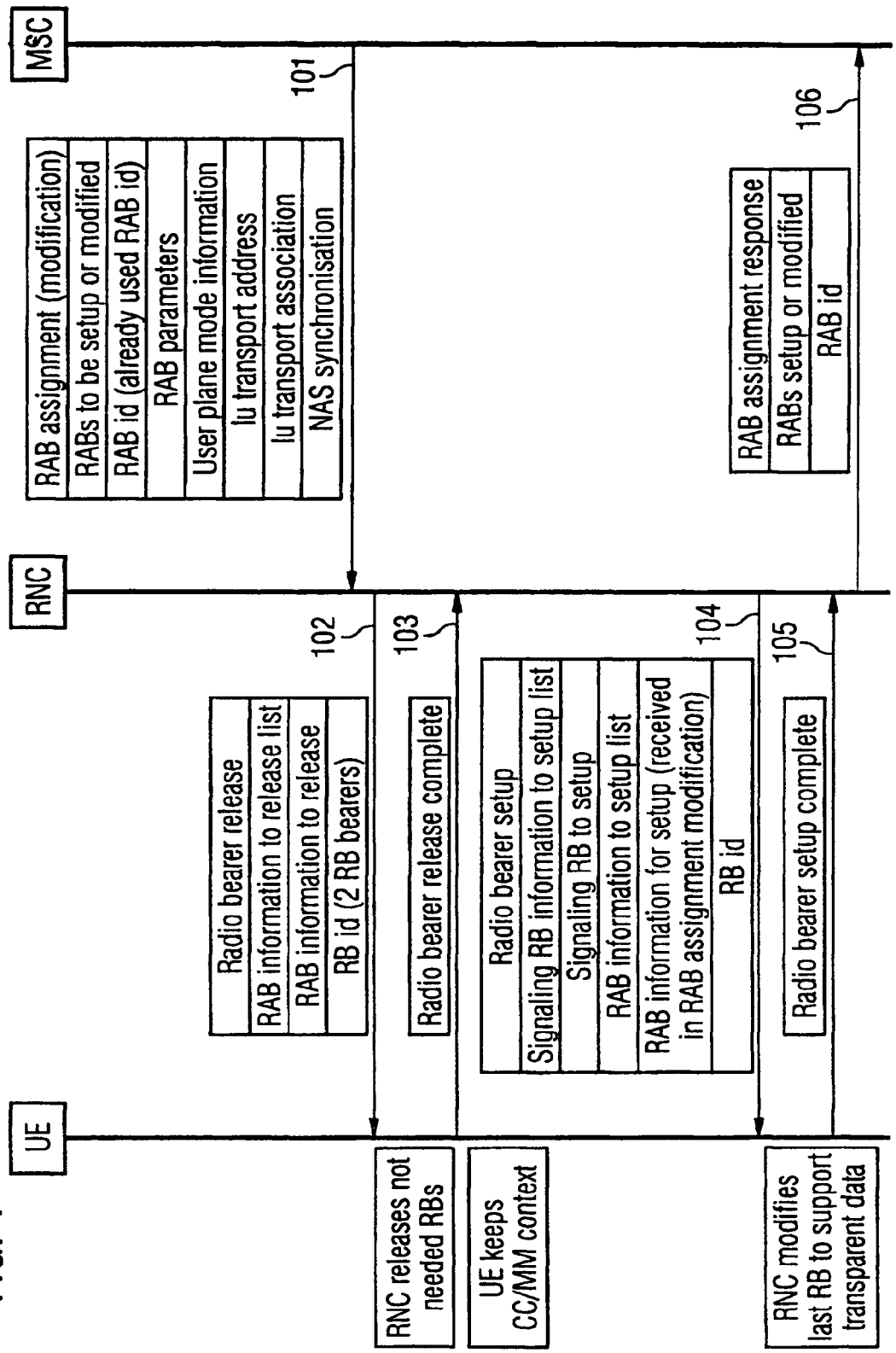
FIG. 1: depicts a signal flow for an active voice call and a waiting data call according to the invention.

FIG. 1 depicts a signal flow for a service alteration from an active voice call to a waiting data call according to the invention. The figure shows a mobile services switching centre MSC, a radio network controller RNC, and a user equipment UE. The user equipment UE and the mobile services switching centre MSC already agreed to accept the waiting data call. The data call will be through connected to the user equipment UE in a transparent mode.

The same signal flow applies for the reactivation of a data call that has been put on hold after a speech call has been offered as a waiting call.

A first signal 101 is sent from the core network node MSC to the access node RNC comprising a RAB assignment modification, that identifies a radio access bearer that is to be modified by using a RAB identification RAB id. The RAB identification identifies the RAB that is already used for the currently active speech call. The message 101 also comprises RAB parameter as defined in the 3GPP technical specification TS25.413, published December 2000. Furthermore the message comprises a user plane mode information parameter. In the specification the user plane mode information parameter is sent only in the case of a setup. In the invented method is sent in the case of a modification of a RAB, too.

The receiving radio network controller RNC recognises the radio access bearer change as it already stored a set of parameters associated to the RAB identification RAB id, and the parameter values received and the parameter values stored differ in at least one parameter value.

In the example the speech connection uses three radio bearers and the data connection only one radio bearer. The radio network controller RNC sends a radio bearer release message 102 to the user equipment UE to release two of the three radio bearer, the message comprising a RAB information to release two radio bearer identified by their radio bearer identification RB id.

The user equipment acknowledges the release of the two radio bearers with a radio bearer release complete message 103. The user equipment keeps the call control and the mobility management contexts established for the formerly active speech call, even in an embodiment of the invention wherein all radio bearers are released and a new radio bearer is set up. The call control context and the mobility management context have been created by NAS (Non Access Stratum) signalling, for example DTAP signalling.

The radio network controller RNC sends a radio bearer setup message 104 to the user equipment UE. In the depicted embodiment of the invention the radio bearer set up message is used for the modification of an existing radio bearer. In a further embodiment of the invention, the bearer is not modified but all bearers are released and a new one is set up. The radio bearer set up message comprises signalling radio bearer information setup to list that indicates a radio bearer to setup, a RAB information to setup list indication a RAB information for setup, and a radio bearer identification. The RAB information to setup was received by the access node RNC in the message 101.

The user equipment UE modifies the radio bearer in order to support the data connection. It acknowledges the modification by sending a radio bearer setup complete message 105 to the radio network controller RNC.

The radio network controller RNC informs the mobile services switching centre MSC about the successful adaptation of the connection between the user equipment UE and the radio network controller RNC by sending a RAB assignment response message 106. The assignment response message 106 comprises the RAB identification RAB id of the modified RAB.

In an embodiment of the invention, the set up of a new connection is performed before the release of an existing connection. In said embodiment, the messages 104 and 105 are sent before the messages 102 and 103. In a preferred embodiment, the sequence of release and set up depends on the decision of a decision logic, implemented in the radio network controller RNC. The decision of the decision logic can depend on for example by operator settings, a identification of a user equipment or a parameter value of a message sent by the mobile services switching centre MSC.

Figure 2:
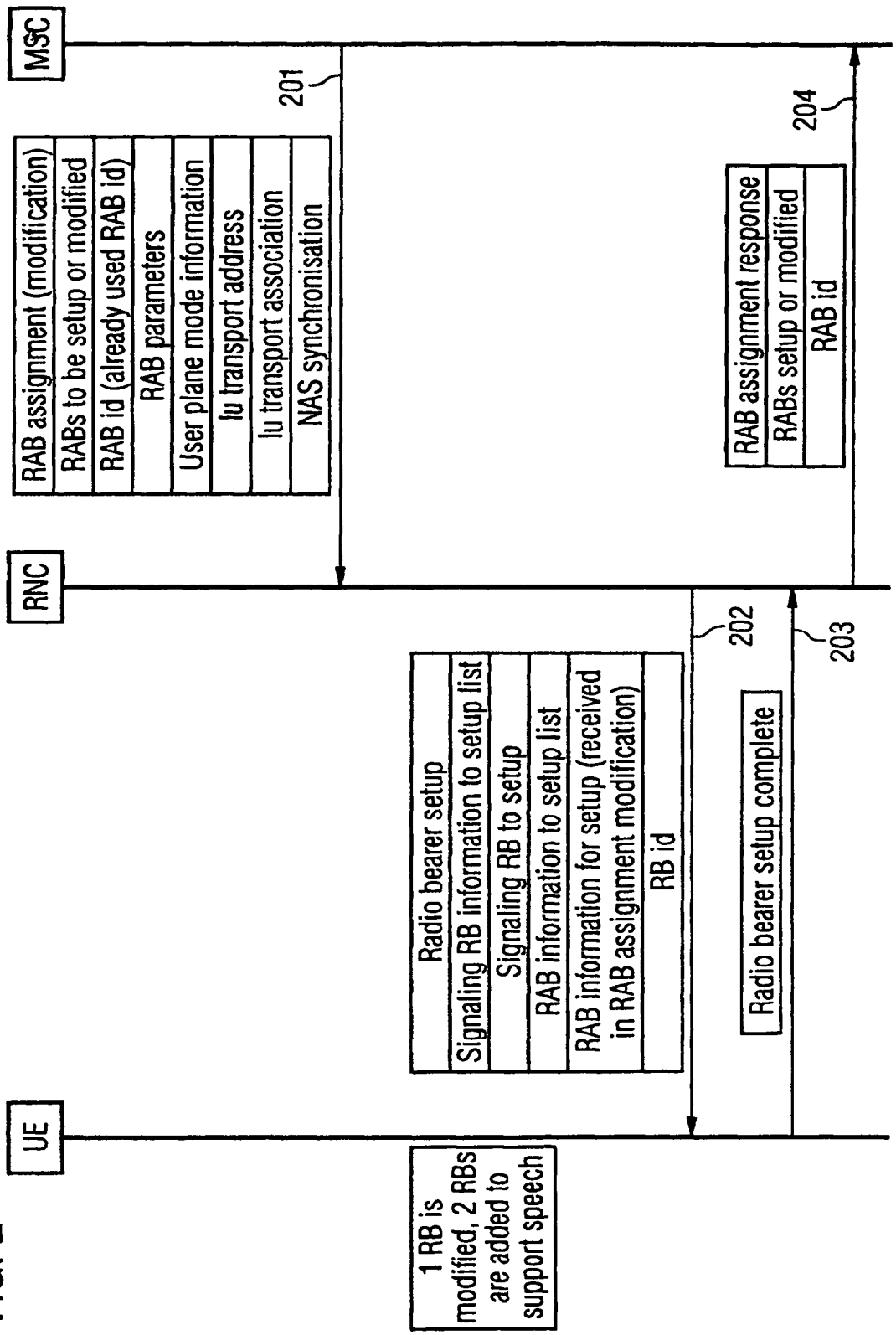
FIG. 2: depicts a signal flow for an active data call and a waiting voice call according to the invention.

FIG. 2 depicts a signal flow for the alteration of an active data call and a waiting voice call according to the invention. The figure comprises a mobile services switching centre MSC, a radio network controller RNC and a user equipment UE. In the example an active data call, transmitted for example in the transparent mode, is replaced by a speech call. The user equipment UE and the core network node UE already agreed to accept the waiting speech call. The speech call will be through connected to the user equipment UE replacing the data call as the active connection. The data call is put on hold.

The same signal flow applies in the case that a data call has been put on hold after a speech call has been offered as a waiting call.

The mobile services switching centre MSC sends a RAB assignment message 201 to the radio network controller RNC. The RAB assignment message comprises the same parameter as message 101, although at least one of them with a different value. The user plane mode information indicates that a data call transmitted in transparent mode will be replaced by a speech call. As the speech call is not transparent at least in the case that a CODEC linked in.

The radio network controller RNC detects that a waiting call is going to replace another call as active call from the fact that the RAB parameter value for a RAB differ from stored parameter values in at least one parameter value. A RAB identifier identifies the RAB.

As the speech call requires three radio bearers instead of one bearer as the data call, the radio network controller RNC sends a radio bearer setup message 202 to the user equipment UE. The Radio bearer setup message is in this example is used for the modification of the currently used radio bearer and the setup of two further radio bearers. It comprises a signalling RB (radio bearer) information to setup bearer to which are identified by three radio bearer identifications. The message further comprises a RAB setup information list with RAB information for setup. This information has been received by the radio network controller RNC from the mobile services switching centre MSC in message 201.

The user equipment UE modifies the existing radio bearer according to the received information and sets up two further radio bearers. It acknowledges the execution by sending a radio bearer setup complete message 203 to the radio network controller RNC.

The radio network controller RNC informs the mobile services switching centre MSC about the successful modification and setup of radio bearer by sending a RAB assignment response message 204. The message comprises the RAB identification of the RAB that has been modified.

Figure 3:
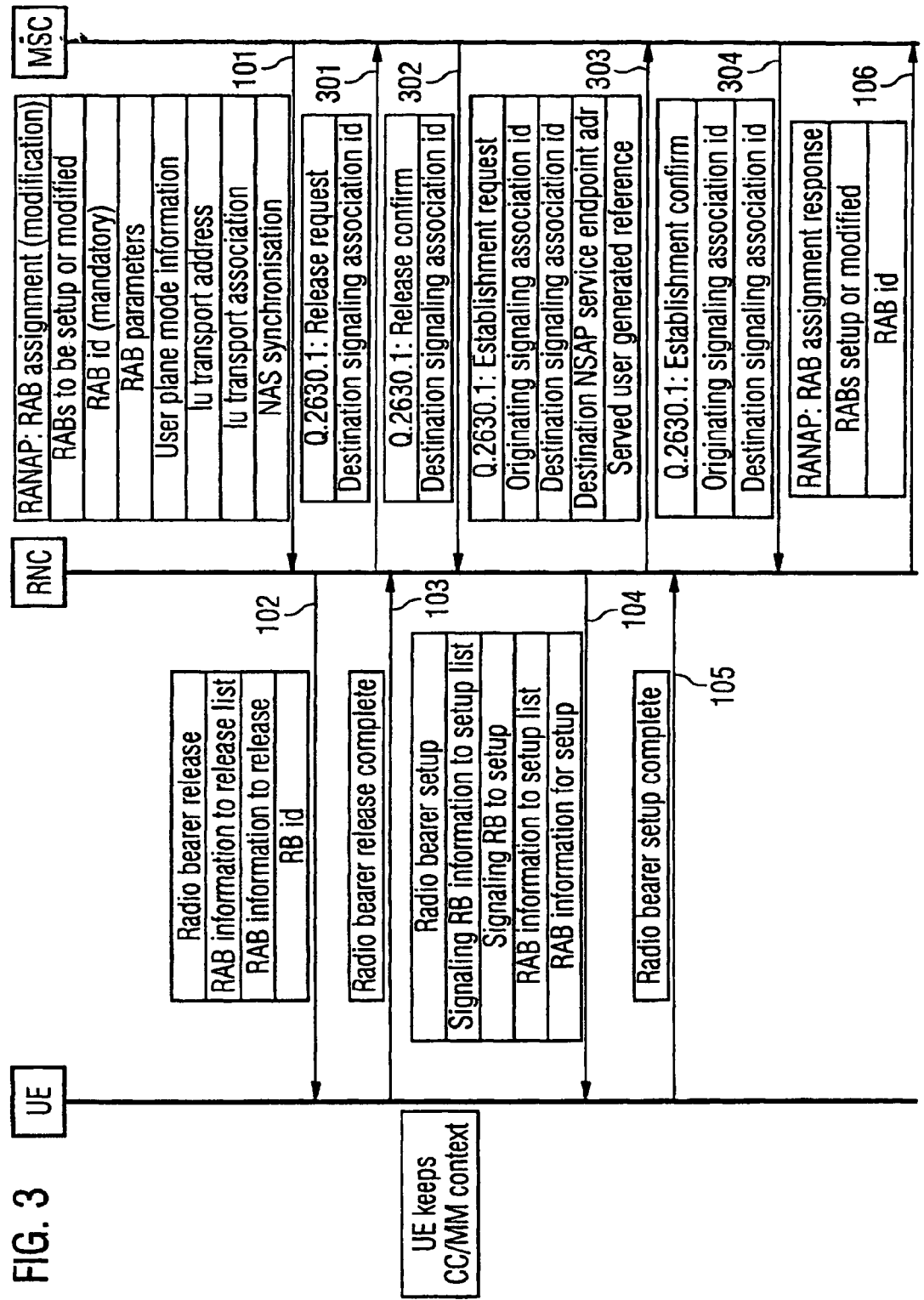
FIG. 3: depicts a signal flow for an active voice call and a waiting data call according to the invention, wherein AAL2 (ATM Adaptation Layer type 2) signalling between an access node and a core network node regarding user plane handling has been added to improve the understanding by a person skilled in the art.

FIG. 3 depicts the signal flow of FIG. 1, with the addition of AAL2 signalling between the radio network controller RNC and the mobile services switching centre MSC.

In a further embodiment of the invention, the mobile services switching centre MSC is a media gateway in a core network that supports bearer independent call control.

The signals 301 Release request, sent from the radio network controller RNC to the mobile services switching centre MSC and 302 Release confirm, sent in the opposite direction, are used to define the signalling partners. This is performed by exchanging a destination association identification.

In signal 303, Establishment request, sent from the radio network controller RNC to the mobile services switching centre MSC, the transport address and the transport association on the Iu interface are transmitted.

The transport address is sent as destination NSAP (Network Service Access Point) service endpoint address and the transport association is sent as the server used generated reference.

The message also comprises an origination signalling association identification. The connection is identified by the destination association identification.

In an embodiment of the invention, the setup of an AAL.2 (Asynchronous transfer mode Adaptation Layer Type 2) connection is requested by message 303.

The mobile services switching centre MSC acknowledges by returning the destination and origination association identification in an establishment confirm message 304.

In an embodiment of the invention, the setup of the AAL.2 connection for the data call is confirmed by message 304.

In an embodiment of the invention the sequence of the release of a connection and the establishment of a connection depends on a decision of a decision logic in the radio network controller RNC. According to the decision of said logic a new connection may be set up before another connection is released. In that case the messages 104 and 105 are sent before the messages 102 and 103; and the messages 304 and 303 are sent before the messages 301 and 302.

The invention claimed is:

1. Method for adapting a number of radio bearers of a connection between a user equipment and a Telecommunications network operating according to Universal Mobile Telecommunication System standards from a first number of radio bearers appropriate for a first service to a second number of radio bearers appropriate for a second service, wherein the user uses the first service when the second service is offered as a waiting call, the method comprising the steps of:
   indicating the beginning of the adaptation by sending a radio access bearer assignment message from a mobile services switching centre to a radio network controller,
   sending, from the radio network controller to the user equipment, a radio bearer setup message for changing the number of radio bearers for the connection,
   modifying the number of radio bearers supported for the connection in the user equipment from the first number of bearers to the second number of bearers,
   acknowledging the modification by sending a radio bearer setup complete message from the user equipment to the radio network controller, and
   indicating the completion of the adaptation to the mobile services switching centre by sending a radio access bearer assignment response message from the radio network controller to the mobile services switching centre.

2. Method according to claim 1, with the additional steps of:
   sending, from the radio network controller to the user equipment, a radio bearer release message for reducing the number of radio bearers for the connection,
   reducing the number of radio bearers that are supported for the connection in the user equipment, and
   acknowledging the reduction of the number of bearers by sending a radio bearer release complete message from the user equipment to the radio network controller.

3. Method according to claim 2, wherein the user equipment keeps a mobility management context and the call control context at the step of changing the number of radio access bearers including the change of radio bearers.

4. Method according to claim 3, with the additional steps of:
   sending a release request message from the radio network controller to the mobile services switching centre to release the connection for the first service,
   releasing the connection for the first service and sending a release confirm message from the mobile services switching centre to the radio network controller,
   sending an establishment request message from the radio network controller to the mobile services switching centre to set up a connection for the second service,
   setting up a connection for the second connection and sending an establishment confirm message from the mobile services switching centre to the radio network controller to confirm the setup of the connection for the second service.

5. Method according to claim 4, wherein the setting up of the second connection is performed before the releasing of the first connection.

6. Method performed in a user equipment for adapting a number of radio bearers of a connection between the user equipment and a Telecommunications network operating according to Universal Mobile Telecommunication System standards from a first number of radio bearers appropriate for a first service to a second number of radio bearers appropriate for a second service, wherein the user uses the first service when the second service is offered as a waiting call, the method comprising the steps of:

receiving, from a radio network controller of the telecommunications network, a radio bearer setup message for changing the number of radio access bearers for the connection, changing the supported number of radio bearers for the connection from the first number of bearers to the second number of bearers, acknowledging the modification by sending a radio bearer setup complete message to the radio network controller;

receiving from the radio network controller a radio bearer release message for reducing the number of radio bearers for the connection;

reducing the number of radio bearers that are supported for the connection; and acknowledging the reduction of the number of bearers by sending a radio bearer release complete message to the radio network controller.

7. Method according to claim 6, wherein the user equipment keeps a mobility management context and the call control context at the step of changing the radio access bearer that includes the change of number of radio bearers.

8. Method performed in a radio network controller of a Telecommunications network operating according to Universal Mobile Telecommunication System standards for adapting a number of radio bearers of a connection to user equipment from a first number of radio bearers appropriate for a first service to a second number of radio bearers appropriate for a second service, wherein the user uses the first service when the second service is offered as a waiting call, the method comprising the steps of;

receiving, from a mobile services switching centre a radio access bearer assignment message for indicating the start of the adaptation of radio access bearers, sending to the user equipment a radio bearer setup message for changing the number of radio bearers for the connection, receiving a radio bearer setup complete message from the user equipment as an acknowledgment for the change of the number of radio bearers supported by the user equipment for the connection, and sending a radio bearer assignment response message to the mobile services switching centre to indicate the completion of the adaptation;

sending to the user equipment a radio bearer release message for reducing the number of radio bearers for the connection, receiving a radio bearer release complete message from the user equipment as an acknowledgment for the reduction of the number of bearers supported for the connection by the user equipment.

9. Method according to claim 8 with the additional steps of:

sending a release request message to the mobile services switching centre to release a connection for the first service, receiving a release confirm message from the mobile services switching centre confirm message, sending an establishment request message to request the set up of a connection for the second service, and receiving an establishment confirm message.

10. Method according to claim 8, wherein the establishment of a connection for the second service is performed before releasing the connection for the first service.

11. Method according to 10, wherein the sequence of establishment and release of a connection depends on a parameter value received from the mobile services switching centre.

12. Method performed in a mobile services switching centre of a Telecommunications network operating according to Universal Mobile Telecommunication System standards for adapting a number of radio bearers of a connection to user equipment from a first number of radio bearers appropriate for a first service to a second number of radio bearers appropriate for a second service, wherein the user uses the first service when the second service is offered as a waiting call, the method comprising the steps of:

sending, to a radio network controller a radio access bearer assignment message for indicating the start of the adaptation of the number of radio access bearers, and receiving a radio bearer assignment response message from the radio network controller as an indication of the completion of the adaptation;

receiving a release request message from the radio network controller for releasing a connection for the first service, releasing the first connection for the first service, sending a release confirm message to the radio network controller, receiving an establishment request message from the radio network controller for the set up of a connection for the second service, setting up the connection for the second service, and sending an establishment confirm message to the radio network controller.

13. An apparatus for adapting a number of radio bearers of a connection between the user equipment and a Telecommunications network operating according to Universal Mobile Telecommunication System standards from a first number of radio bearers appropriate for a first service to a second number of radio bearers appropriate for a second service, wherein the user uses the first service when the second service is offered as a waiting call, the apparatus comprises:

means for receiving, from a radio network controller of the telecommunications network, a radio bearer setup message for changing the number of radio access bearers for the connection;

means for changing the supported number of radio bearers for the connection from the first number of bearers to the second number of bearers; and means for acknowledging the modification by sending a radio bearer setup complete message to the radio network controller;

means for receiving from the radio network controller a radio bearer release message for reducing the number of radio bearers for the connection, means for reducing the number of radio bearers that are supported for the connection, and means for acknowledging the reduction of the number of bearers by sending a radio bearer release complete message to the radio network controller.

14. The apparatus of claim 13, further comprising means for maintaining a mobility management context and the call control context when changing the radio access bearer, that includes the change of number of radio bearers.

* * * * *